United States Patent
Himmelstoss et al.

(10) Patent No.: US 11,112,488 B2
(45) Date of Patent: Sep. 7, 2021

(54) METHOD FOR OPERATING A RADAR SENSOR DEVICE AND RADAR SENSOR DEVICE

(71) Applicant: Robert Bosch GmbH, Stuttgart (DE)

(72) Inventors: Armin Himmelstoss, Weissach Im Tal (DE); Thomas Binzer, Ingersheim (DE); Thomas Brosche, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 16/390,696

(22) Filed: Apr. 22, 2019

(65) Prior Publication Data
US 2019/0331766 A1 Oct. 31, 2019

(30) Foreign Application Priority Data
Apr. 27, 2018 (DE) .......................... 102018206533.0

(51) Int. Cl.
| | | |
|---|---|---|
| *G01S 13/06* | (2006.01) | |
| *G01S 7/03* | (2006.01) | |
| *G01S 13/931* | (2020.01) | |
| *G01S 7/42* | (2006.01) | |
| *G01S 7/41* | (2006.01) | |

(Continued)

(52) U.S. Cl.
CPC .............. *G01S 7/032* (2013.01); *G01S 7/411* (2013.01); *G01S 7/42* (2013.01); *G01S 13/06* (2013.01); *G01S 13/931* (2013.01); *H01Q 1/3208* (2013.01); *H01Q 21/06* (2013.01)

(58) Field of Classification Search
CPC ........ G01S 13/06; G01S 13/42; G01S 13/931; G01S 7/032; G01S 7/411; G01S 7/42; H01Q 1/3208; H01Q 1/3233; H01Q 21/06
See application file for complete search history.

(56) References Cited

U.S. PATENT DOCUMENTS

| | | | |
|---|---|---|---|
| 2016/0116582 A1* | 4/2016 | Chang ................... | G01S 13/325 342/25 A |
| 2016/0252608 A1* | 9/2016 | Ebling .................. | G01S 13/931 342/149 |

(Continued)

OTHER PUBLICATIONS

Sandeep Rao, "MIMO Radar," Texas Instrument Application Report, SWRA554, May 2017.

*Primary Examiner* — Timothy A Brainard
(74) *Attorney, Agent, or Firm* — Norton Rose Fulbright US LLP; Elizabeth Tretter

(57) ABSTRACT

A method for operating a radar sensor device, for example of a motor vehicle, including a plurality of transmitting antenna elements and a plurality of receiving antenna elements, where at least a part of the antenna elements are situated along an arc and/or intersecting planes and where the antenna elements are divided into a plurality of antenna systems that each includes at least two of the transmitting antenna elements and at least two of the receiving antenna elements, includes: operating each of the antenna systems as an independent multiple-input-multiple-output radar system, the operating including: transmitting transmit signals using the transmitting antenna elements that are of first and second ones of the antenna systems, whose transmission ranges overlap and whose transmit signals are orthogonal to one another; and receiving reflections of the transmitted transmit using the receiving antenna elements.

12 Claims, 5 Drawing Sheets

(51) Int. Cl.
*H01Q 21/06* (2006.01)
*H01Q 1/32* (2006.01)

(56) References Cited

U.S. PATENT DOCUMENTS

2018/0095162 A1\* 4/2018 Fetterman ............... G01S 7/023
2018/0113210 A1\* 4/2018 Izadian ................... G01S 13/42
2019/0154794 A1\* 5/2019 Ocket ................... H01Q 1/3283

\* cited by examiner

METHOD FOR OPERATING A RADAR SENSOR DEVICE AND RADAR SENSOR DEVICE

CROSS-REFERENCE TO RELATED APPLICATIONS

The present application claims priority under 35 U.S.C. § 119 to DE 10 2018 206 533.0, filed in the Federal Republic of Germany on Apr. 27, 2018, the content of which is hereby incorporated by reference herein in its entirety.

FIELD OF THE INVENTION

The present invention relates to a radar device and to a method for operating a radar sensor device.

BACKGROUND

Radar systems for driver assistance systems have been installed for some time in vehicles and motor vehicles. Using the radar sensors, distance, velocity, and angles in relation to objects can be detected within the radar field of vision. The angle resolution of the sensor, i.e., the capability of separating targets having small differences in the angle from one another, is dependent on the so-called antenna aperture, the physical dimensions of the antenna. So-called multiple-input-multiple-output radar systems are being used more and more frequently to virtually enlarge the antenna aperture. An artificial or virtual aperture enlargement is achieved by the skillful arrangement of the transmitting elements or the transmission channels in relation to the receiving elements or receiving channels and by the separation of the transmission channels, for example, in frequency or time. This results in a higher angle resolution without the physical dimensions of the antenna having to be enlarged or having been enlarged for this purpose.

The antennas of the presently used radar sensors moreover have a planar aperture, i.e., the antenna elements are located in one plane. The antenna elements are usually implemented in the form of patch antennas. Only a single sensor having a restricted field of vision is usually installed in vehicles, for example, for monitoring preceding vehicles. In the course of the functional expansion in driver assistance systems, multiple radar sensors are being used more and more frequently, which together cover a larger field of vision, for example, the entire front area of up to 180°. Thus, for example, so-called midrange radar sensors (MRR) are installed in the middle on the "front" and additional MRR "corner" sensors are installed on the vehicle front side, which are located on the front vehicle corners. The sensors each have a planar antenna, whose angle estimation accuracy and angle resolution is dependent on the angle.

Conformal antennas are under discussion to enhance the field of vision of a single sensor having constant angle resolution. The antenna elements are no longer located on a planar plane, but rather on a curved plane.

For the operating mode of a MIMO radar system, it is essential for the field of vision of the individual transmission channels (TX) to essentially correspond with that of the receiving channels (RX). However, this is often not the case with a conformal antenna, in which the channels are located on a curved surface. Moreover, the virtual channels are often not located on the conformal contour in this case. This can result in false signals and/or a degradation of the angle resolution.

SUMMARY

Example embodiments of the present invention can advantageously enable a method for operating a radar sensor device or a radar sensor device to be provided, which detects objects at a high angle resolution or in which objects can be detected at a high angle resolution.

According to a first aspect of the present invention, a method is provided for operating a radar sensor device, in particular in a motor vehicle, the radar sensor device including a plurality of antenna elements, the plurality of antenna elements including multiple transmitting antenna elements and multiple receiving antenna elements, a part of the antenna elements, in particular all antenna elements, being situated along an arc and/or on different intersecting planes, the antenna elements being divided into multiple antenna systems, each antenna system including at least two transmitting antenna elements and two receiving antenna elements, the method including the following steps: transmitting transmit signals using the transmitting antenna elements of a first antenna system and a second antenna system of the antenna systems, transmitting antenna elements, whose transmission ranges overlap, having transmit signals orthogonal to one another; and receiving reflections of the emitted transmit signals using the receiving antenna elements, each antenna system being operated as an independent multiple-input-multiple-output radar system.

One advantage of this is that generally a large (virtual) antenna aperture is achieved. Moreover, the number of real, physically existing transmitting or receiving channels, i.e., the nonvirtual transmitting and receiving channels, can typically be small, since multiple antenna elements can be supplied or operated using the same transmit signal. Using the method, the radar sensor device generally has a high angle resolution which is nearly constant over a large angle range at the same time. Moreover, using the method, a radar sensor device which occupies a particularly small spatial volume can typically be used. In general, a technically simple and cost-effective radar sensor device can thus be used.

According to a second aspect of the present invention, a radar sensor device is provided, in particular in a motor vehicle, including a plurality of antenna elements, the plurality of antenna elements including transmitting antenna elements and receiving antenna elements, the plurality of antenna elements being divided into multiple antenna systems, a part of the antenna elements, in particular all antenna elements, being situated along an arc and/or on different intersecting planes, each antenna system including at least two transmitting antenna elements and two receiving antenna elements, the radar sensor device being designed in such a way that transmitting antenna elements, whose transmission ranges overlap, have transmit signals orthogonal to one another, where each antenna system is operable as an independent multiple-input-multiple-output radar system.

One advantage of this is that the radar sensor device generally has a large (virtual) antenna aperture. Moreover, the number of the real, physically existing transmitting or receiving channels, i.e., the nonvirtual transmitting and receiving channels, can typically be small in the radar sensor device, since multiple antenna elements can be supplied or operated using the same transmit signal. The radar sensor device generally has a high angle resolution which is nearly constant over a large angle range at the same time. Moreover, the radar sensor device can be designed in a particularly space-saving manner. The radar sensor device can thus generally be designed as technically simple and cost-effective.

The fundamentals of a multiple-input-multiple-output radar system (MIMO radar) are described in the following citation: Sandeep Rao, "MIMO radar," Texas Instrument Application Report, SWRA554, May 2017.

An independent multiple-input-multiple-output radar system (MIMO radar system) can be in particular a MIMO radar system, whose transmit signals and received signals are analyzed independently of transmit signals and received signals of other MIMO radar systems to detect objects. During the analysis of the signals or data of the particular independent MIMO radar system to detect objects, in particular the signals or data of other (independent) MIMO radar systems can thus remain unconsidered. The independent MIMO radar systems can thus each be operated as independent MIMO radar systems. The transmit signals of one independent MIMO radar system are typically not completely independent in the present invention from the transmit signals of other independent MIMO radar systems.

In the case of transmit signals orthogonal to one another, it can generally be identified whether signals received by the receiving antenna elements or received signals, which were reflected from objects, originate from a first transmit signal or from a second transmit signal. A first transmit signal can differ from a second transmit signal orthogonal to the first transmit signal, for example, due to different transmission times (so-called time division multiplex, TDM), different frequencies (so-called frequency division multiplex, FDM), and/or different encryptions (so-called code division multiplex, CDM).

Ideas for example embodiments of the present invention can be considered to be based, inter alia, on the concepts and findings described hereafter.

According to an example embodiment of the method, at least one of the transmitting antenna elements is part of multiple antenna systems. This has an advantage that typically a particularly space-saving and cost-effective radar sensor device can be used.

According to an example embodiment of the method, the transmission ranges of the transmitting antenna elements of the first antenna system have essentially no overlap with the transmission ranges of the transmitting antenna elements of the second antenna system. In this way, in general the number of the transmission channels or transmit signals can be reduced still further. Moreover, the method is generally particularly technically simple to implement.

According to an example embodiment of the method, at least a part of the transmitting antenna elements, whose transmission ranges do not overlap, have the same transmit signal. This has an advantage that the number of the transmission channels can typically be reduced still further.

According to an example embodiment, the number of the antenna systems is at least three. One advantage of this is that the method can generally also be used in a radar sensor device, whose transmitting antenna elements are distributed over a great length or a large volume. The method can therefore typically also be used in a radar sensor device which covers a particularly large area or a particularly large volume with radar signals.

According to an example embodiment of the radar sensor device, the radar sensor device is operable in such a way that at least one of the transmitting antenna elements is part of multiple antenna systems. This has an advantage that the radar sensor device can typically be designed in a particularly space-saving and cost-effective manner.

According to an example embodiment of the radar sensor device, the transmitting antenna elements are situated and aligned in such a way that the transmission ranges of the transmitting antenna elements of a first antenna system have essentially no overlap with the transmission ranges of the transmitting antenna elements of a second antenna system. In this way, in general the radar sensor device can be operated using a particularly small number of transmission channels or transmit signals. Moreover, the radar sensor device can be designed in a particularly technically simple and cost-effective manner.

According to an example embodiment of the radar sensor device, the radar sensor device is operable in such a way that at least a part of the transmitting antenna elements, whose transmission ranges do not overlap, have the same transmit signal. This has an advantage that the radar sensor device can typically be operated using a particularly small number of transmission channels or transmit signals. The radar sensor device can thus typically be designed in a particularly technically simple and cost-effective manner.

According to an example embodiment of the radar sensor device, the number of the antenna systems is at least three. One advantage of this is that a high angle resolution can be achieved even in a radar sensor device whose transmitting antenna elements are distributed over a great length or a large volume. The radar sensor device can therefore typically cover a particularly large area or a particularly large volume with radar signals and nonetheless have a high angle resolution.

It is to be noted that some of the possible features and advantages of the present invention are described herein with reference to different example embodiments of a radar sensor device and a method for operating a radar sensor device. Those skilled in the art recognize that the features can be combined, adapted, or exchanged in a suitable way to arrive at further example embodiments of the present invention.

Example embodiments of the present invention are described hereafter with reference to drawings that are solely schematic and are not true to scale and in which identical reference numerals identify identical or identically-acting features. Neither the drawings nor the description are to be interpreted as restricting the present invention.

DETAILED DESCRIPTION

Figure 1:
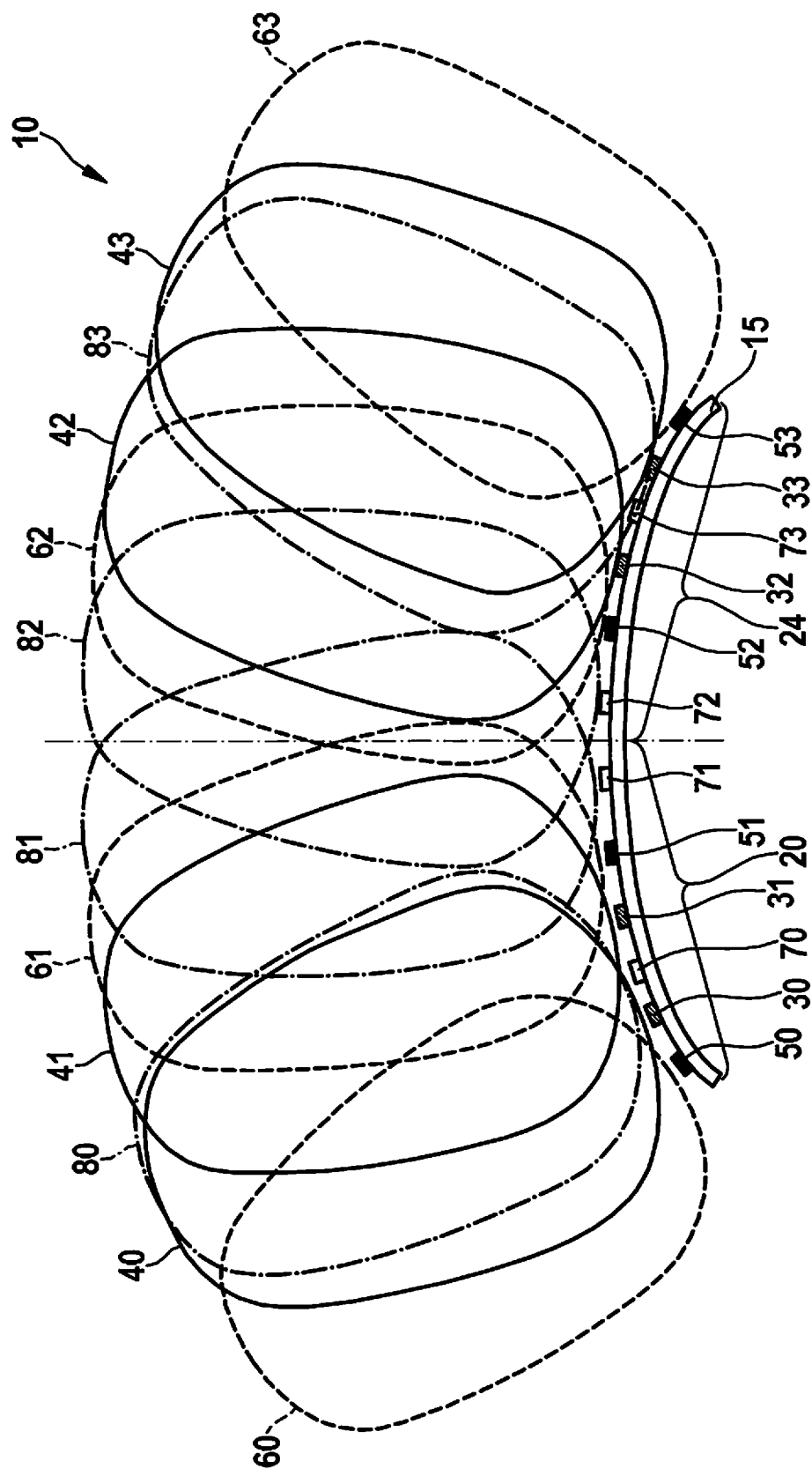
FIG. 1 shows a radar sensor device according to a first example embodiment of the present invention.

FIG. 1 shows a first example embodiment of radar sensor device 10 according to the present invention. Radar sensor device 10 includes multiple antenna elements. In particular, radar sensor device 10 includes four transmitting antenna elements 30-33 and four receiving antenna elements 50-55.

The antenna elements are divided or allocated into two antenna systems 20, 24. This means that radar sensor device 10 includes a first antenna system 20 and a second antenna system 24.

The antenna elements are located on a curved aperture or on an arc 15. According to alternative example embodiments, the antenna elements are located or situated on multiple different planes, which intersect. In particular, the antenna elements, which can each be operated as an independent MIMO radar system, are located or situated on the same first plane, and at least one antenna element of another independent MIMO radar system is situated on a second plane, the second plane intersecting the first plane, i.e., the second plane not extending in parallel to the first plane. In other words, at least a part of the antenna elements is situated on different straight lines which extend linearly in sections. A mixture of antenna elements situated on an arc and antenna elements situated on different planes, the planes partially intersecting and/or partially being parallel to one another, can also be provided.

In the example embodiment shown in FIG. 1, first antenna system 20 has two transmitting antenna elements 30-33 and two receiving antenna elements 50, 51. Second antenna system 24 has two transmitting antenna elements 30-33 and two receiving antenna elements 52, 53. Antenna systems 20, 24 are formed disjunct from one another, i.e., no antenna element is part of both antenna systems 20, 24. Therefore, neither a transmitting antenna element 30-33 nor a receiving antenna element 50-55 is part of both antenna systems 20, 24.

Transmitting antenna elements 30-33 and receiving antenna elements 50-55 are also referred to as physical antenna elements.

Both antenna systems 20, 24 are operated as independent multiple-input-multiple-output radar systems (MIMO radar systems). First antenna system 20 thus includes two virtual receiving antenna elements 70, 71. Moreover, in this way second antenna system 20, 24 includes two virtual antenna elements 72, 73. Virtual antenna elements 70-73 of particular antenna systems 20, 24 are generally located close to arc 15 or on arc 15, on which the physical antenna elements are situated.

Transmission ranges 40-42 of transmitting antenna elements 30-33 are shown by solid lines. Reception ranges 60-65 of receiving antenna elements 50-55 are shown by dashed lines. Virtual reception ranges 80-84 of virtual antenna elements 70-73 are identified by a dot-dash line.

Radar sensor device 10 in FIG. 1 is operated using precisely two transmission channels. A first transmitting antenna element 30 of first antenna system 20 is supplied or operated using the same first transmit signal/transmission channel with which a first transmitting antenna element 32 of second antenna system 24 is supplied. Second transmitting antenna element 31 of first antenna system 20 is also supplied or operated using the same second transmit signal with which a second transmitting antenna element 33 of second antenna system 24 is supplied or operated. The first transmit signal or the first transmission channel is supplied to first antenna system 20 and second antenna system 24. This also applies to the second transmit signal or the second transmission channel.

The first transmit signal is orthogonal to the second transmit signal, so that it can be identified whether signals received by receiving antenna elements 50-55, which were reflected from objects, originate from the first transmit signal or the second transmit signal. The first transmit signal can be differentiated from the second transmit signal, for example, by different transmission times (so-called time division multiplex, TDM), different frequencies (so-called frequency division multiplex, FDM), and/or different encryptions (so-called code division multiplex, CDM).

Transmission ranges 40, 41 of transmitting antenna elements 30, 31 of first antenna system 20 do not overlap with transmission ranges 42, 43 of transmitting antenna elements 32, 33 of second antenna system 24.

Transmitting antenna elements 30-33 and receiving antenna elements 50-55 are situated alternately on and along arc 15.

Figure 2:
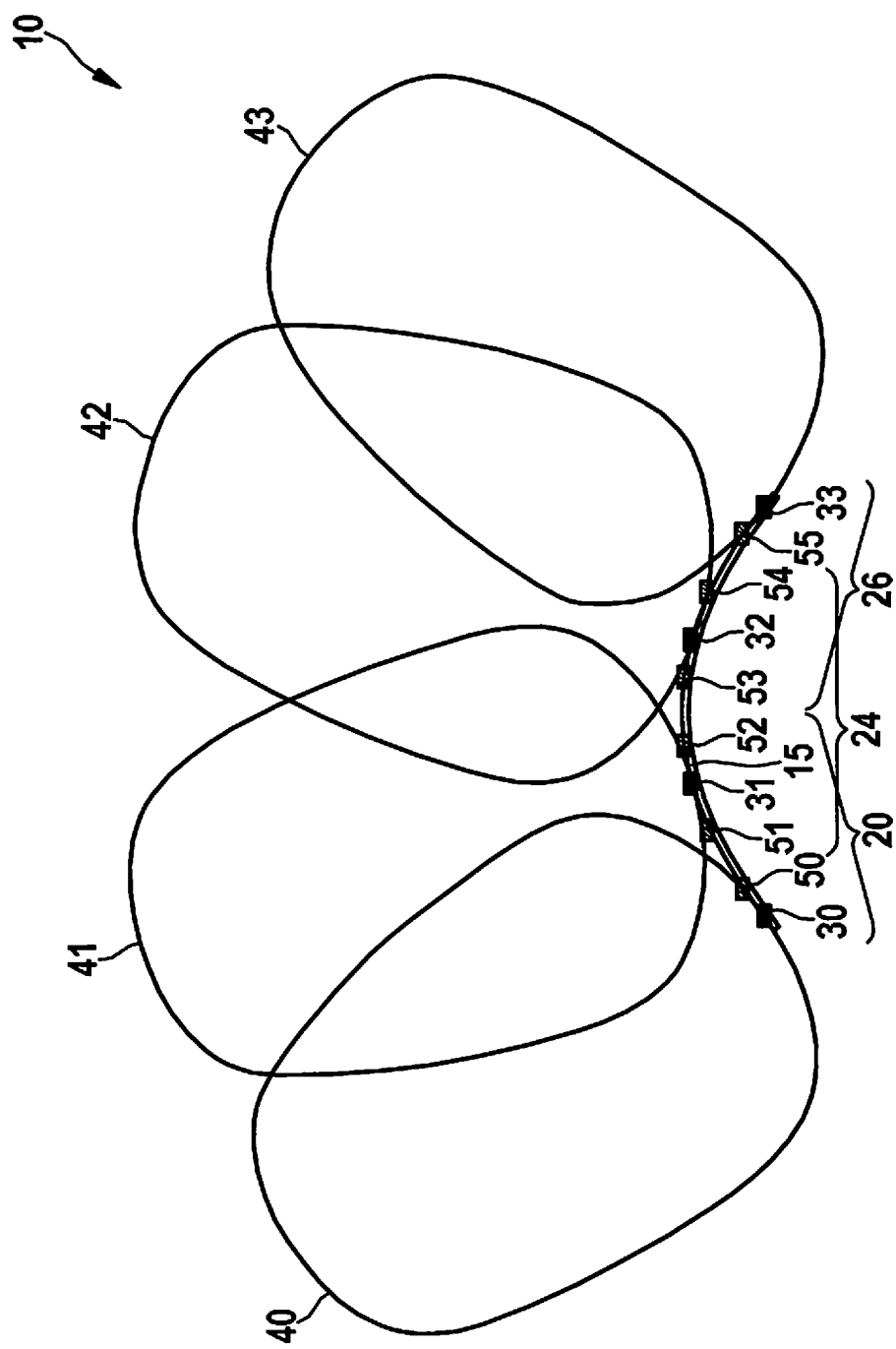
FIG. 2 shows a radar sensor device according to a second example embodiment of the present invention.
Figure 3:
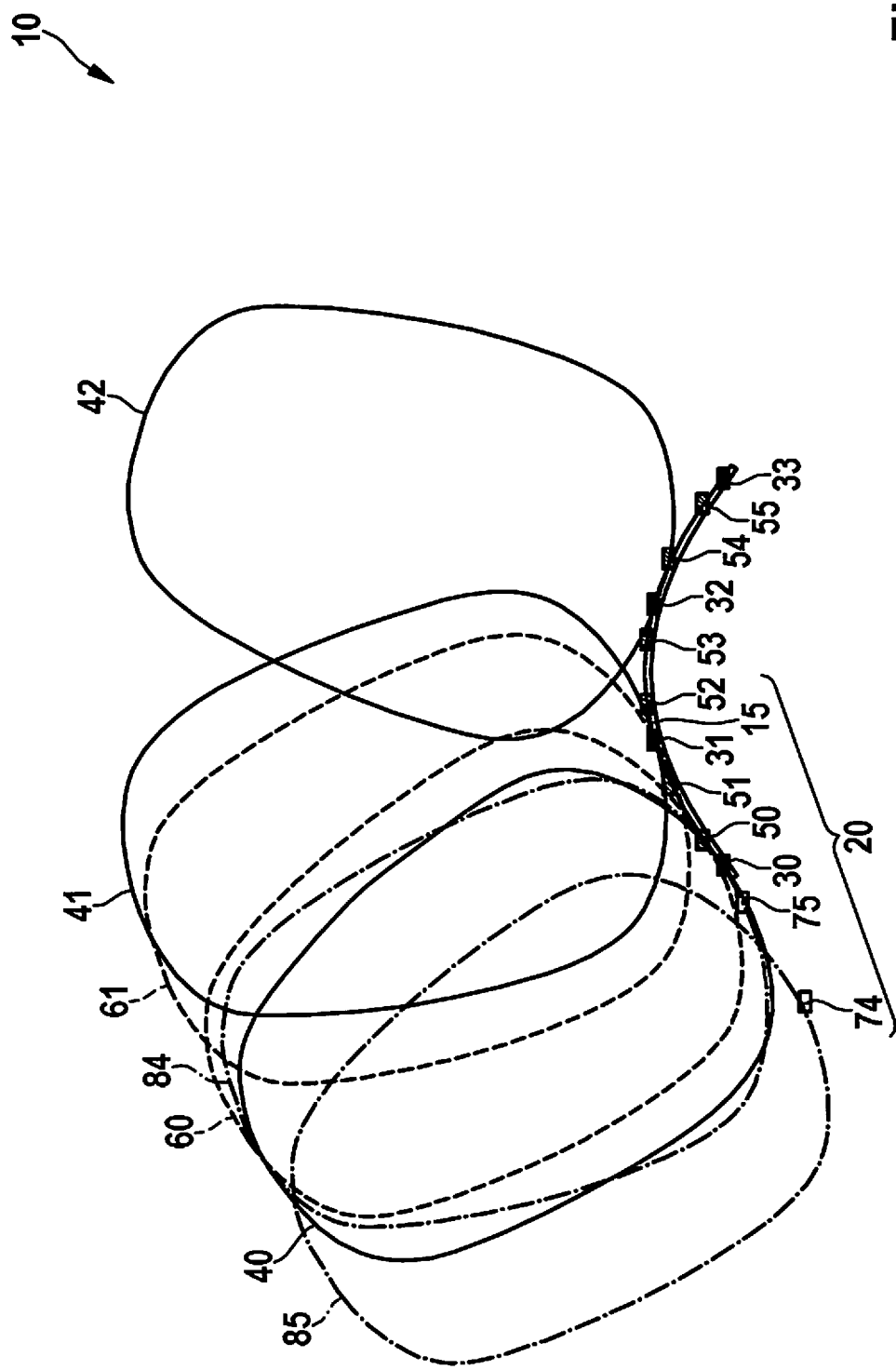
FIG. 3 shows an antenna system of the radar sensor device of FIG. 2 according to an example embodiment of the present invention.
Figure 4:
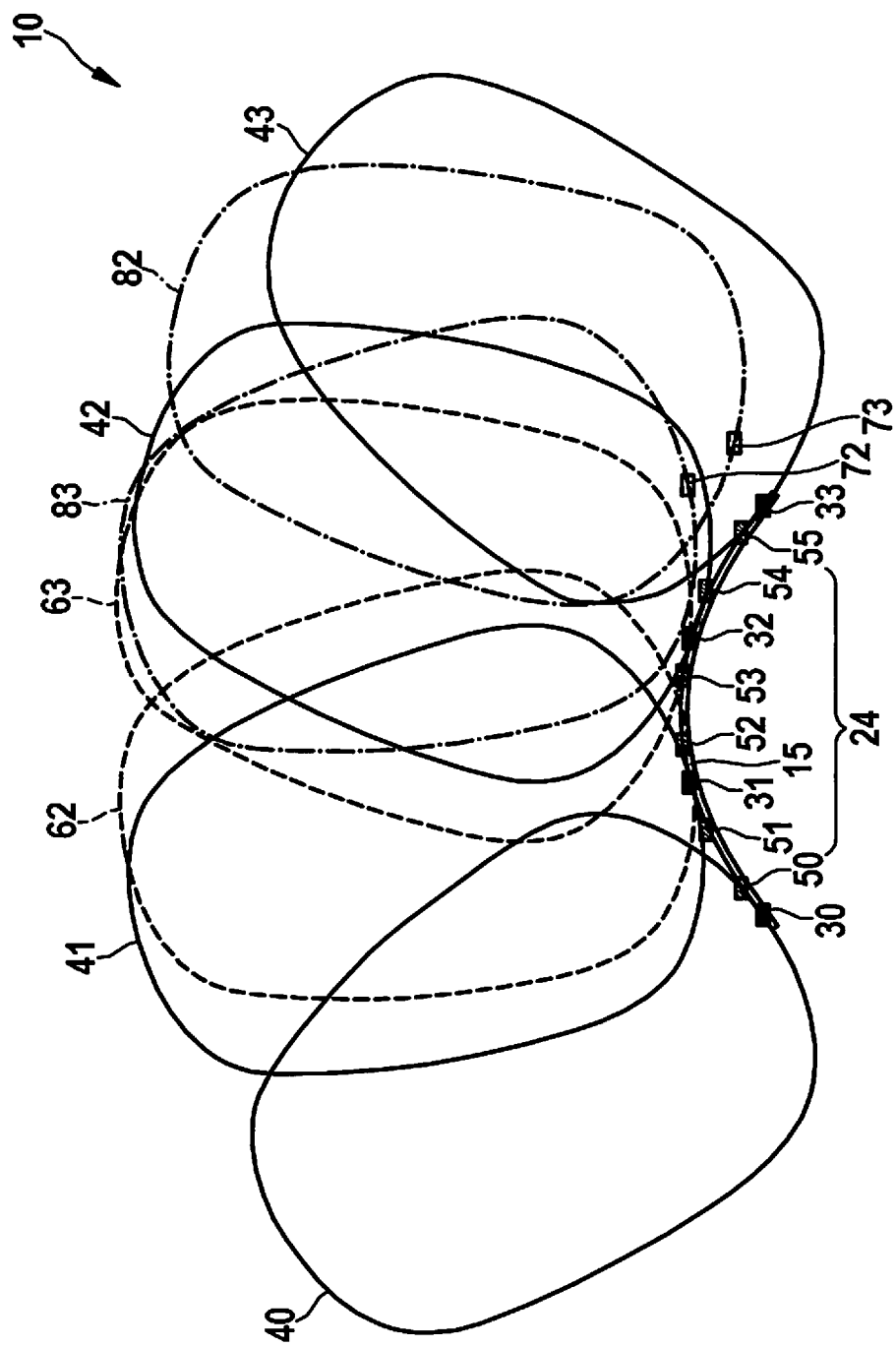
FIG. 4 shows a further antenna system of the radar sensor device of FIG. 2 according to an example embodiment of the present invention.
Figure 5:
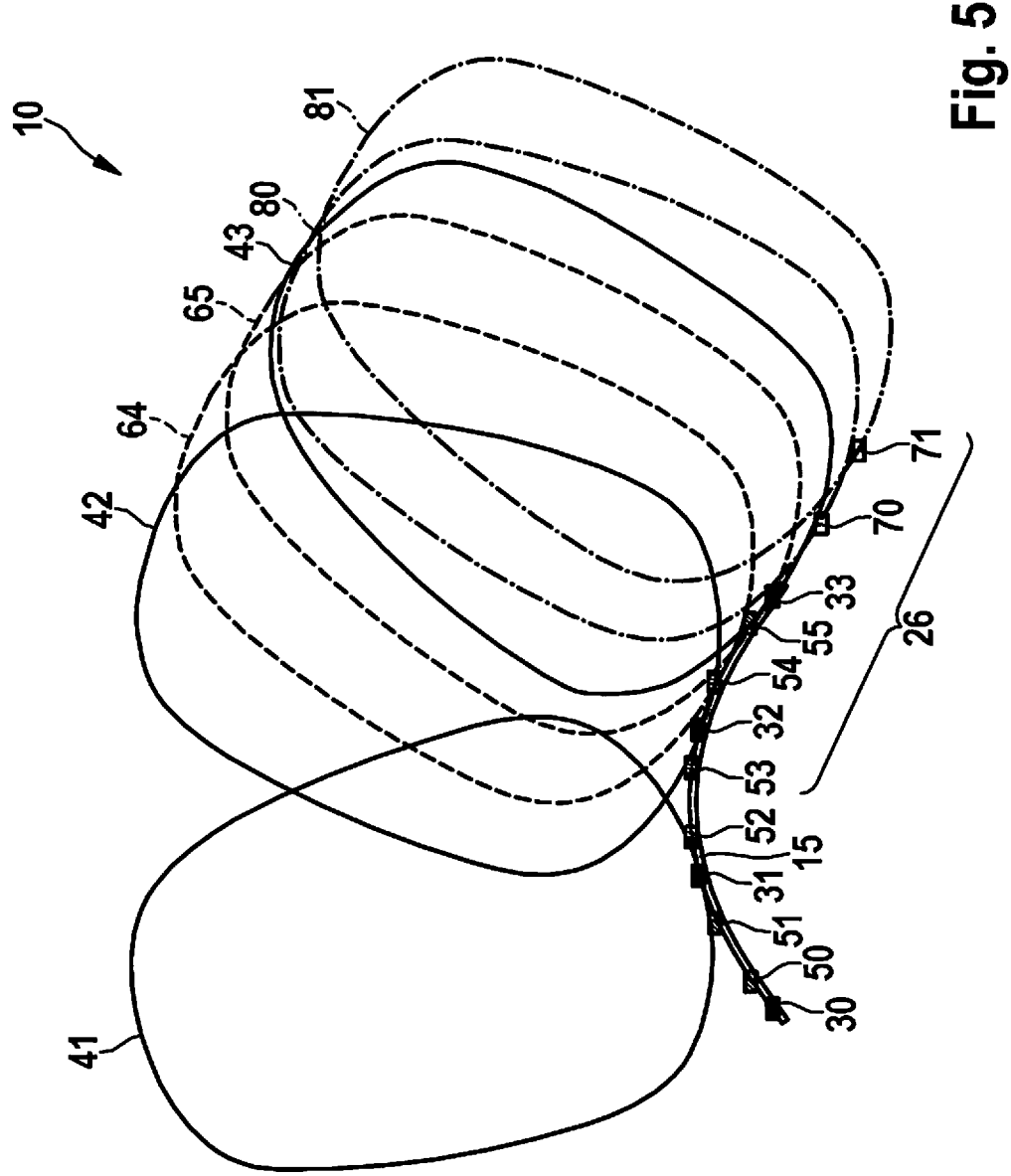
FIG. 5 shows a further antenna system of the radar sensor device of FIG. 2 according to an example embodiment of the present invention.

FIG. 2 shows a second example embodiment of radar sensor device 10 according to the present invention. FIG. 3 shows an antenna system 20 of radar sensor device 10 from FIG. 2. FIG. 4 shows a further antenna system 24 of radar sensor device 10 from FIG. 2. FIG. 5 shows a further antenna system 26 of radar sensor device 10 from FIG. 2.

Radar sensor device 10 of the second example embodiment includes four transmitting antenna elements 30-33 and six receiving antenna elements 50-55. Two receiving antenna elements 50-55 are situated between each two transmitting antenna elements 30-33.

Radar sensor device 10 is divided or allocated into three antenna systems 20, 24, 26. In this case, two middle transmitting antenna elements 31, 32 are each part of two antenna systems 20, 24, 26. First antenna system 20 includes two left transmitting antenna elements 30, 31 and two left receiving antenna elements 50, 51. Second antenna system 24 includes two middle transmitting antenna elements 31, 32 and two middle receiving antenna elements 52, 53. Third antenna system 26 includes two right transmitting antenna elements 32, 33 and two right receiving antenna elements 54, 55.

Each of three antenna systems 20, 24, 26 is operated as an independent multiple-input-multiple-output system, so that each of three antenna systems 20, 24, 26 has virtual receiving antenna elements 70-75 and virtual reception ranges 80-85.

Radar sensor device 10 is operated using three transmission channels or transmit signals. In this case, transmitting antenna elements 30, 31, 32 are supplied via various transmission channels or transmit signals. Transmitting antenna element 33 can again have the same transmit signal as transmitting antenna element 30 or be supplied by the same transmission channel.

Each two transmission ranges 40-43 of transmitting antenna elements 30-33 overlap.

Radar sensor device 10 shown in FIG. 3 has four physical receiving channels. FIG. 3 shows first antenna system 20 of the second example embodiment. Two left transmitting antenna elements 30, 31 are supplied with two transmit signals orthogonal to one another. Second transmitting antenna element 32 from the right in FIG. 3 also has a transmit signal orthogonal to each of the transmit signals of left transmitting antenna element 30 and second transmitting antenna element 31 from the left in FIG. 3. This means these three transmit signals are orthogonal to one another. If, due to the curvature of arc 15 and formation of reception ranges 60, 61, no overlap results with transmission range 42, transmitting antenna element 32 can again be supplied with the same transmit signal as transmitting antenna element 30. Virtual receiving antenna elements 74, 75 of first antenna element 20 are in the vicinity of the extension of arc 15.

FIG. 4 shows second antenna system 24. Virtual receiving antenna elements 72, 73 are only partially located on arc 15, on which physically existing transmitting antenna elements 30-33 and physically existing receiving antenna elements 50-55 are situated.

FIG. 5 shows third antenna system 26. Virtual receiving antenna elements 70, 71 are located on an extension of arc 15.

Each antenna system 20, 24, 26 carries out an angle determination or angle estimation independently from other antenna systems 20, 24, 26. This means that each independent MIMO radar system carries out an angle determination or angle estimation independently from other MIMO radar systems/antenna systems 20, 24, 26.

The orthogonality of transmit signals or transmission channels ensures that it can be identified whether signals received by receiving antenna elements 50-55, which were reflected from objects, originate from a first transmit signal or from a second transmit signal or from a third transmit signal, and can be achieved, for example, by different transmission times (so-called time division multiplex, TDM), different frequencies (so-called frequency division multiplex, FDM), and/or different encryptions (so-called code division multiplex, CDM).

The signals received by receiving antenna elements 50-55 can be processed and analyzed in a shared radar signal processing unit.

As used herein, terms such as "having," "including," etc. do not exclude other elements or steps and terms such as "a" or "one" do not exclude multiples.

What is claimed is:

1. A method for operating a radar sensor device, the radar sensor device including antenna elements including a plurality of transmitting antenna elements and a plurality of receiving antenna elements, wherein all of the antenna elements are situated together along an arc and wherein the antenna elements are divided into a plurality of antenna systems, that each includes at least two of the transmitting antenna elements and at least two of the receiving antenna elements, the method comprising:
   operating each of the antenna systems as an independent multiple-input-multiple-output radar system relative to one another, wherein the operating includes:
      transmitting transmit signals using the transmitting antenna elements of a first antenna system of the antenna systems and the transmitting elements of a second antenna system of the antenna systems, the first antenna system being different than the second antenna system, wherein those of the transmitting antenna elements whose transmission ranges overlap have transmit signals orthogonal to one another; and
      receiving reflections of the transmitted transmit signals using the receiving antenna elements;
      wherein at least one transmitting antenna element of the first antenna system is operated with the same transmit signal as at least one transmitting element of the second antenna system.

2. The method of claim 1, wherein at least one of the transmitting antenna elements is part of more than one of the antenna systems.

3. The method of claim 1, wherein the transmission ranges of the transmitting antenna elements of the first antenna system have essentially no overlap with the transmission ranges of the transmitting antenna elements of the second antenna system.

4. The method of claim 1, wherein at least a part of the transmitting antenna elements, whose transmission ranges do not overlap, have the same transmit signal.

5. The method of claim 1, wherein the plurality of antenna systems includes at least three antenna systems.

6. The method of claim 1, wherein the radar sensor device is installed in a motor vehicle.

7. A radar sensor device comprising:
   a plurality of transmitting antenna elements;
   a plurality of receiving antenna elements;
   wherein:
      the transmitting and receiving antenna elements are divided into a plurality of antenna systems that each includes at least two of the transmitting antenna elements;
      all of the transmitting and receiving antenna elements are situated together along an arc; and
      the antenna systems are operable as an independent multiple-input-multiple-output radar system relative to one another, in which:
         transmit signals are transmitted by the transmitting antenna elements of a first antenna system of the antenna systems and the transmitting elements of a second antenna system of the antenna systems, the first antenna system being different than the second antenna system, wherein those of the transmitting elements whose transmission ranges overlap have transmit signals orthogonal to one another; and
         reflections of the transmitted transmit signals are received using the receiving antenna elements;
         wherein at least one transmitting element of the first antenna system is configured to be operated with the same transmit signal as at least one transmitting element of the second antenna system.

8. The radar sensor device of claim 7, wherein the radar sensor device is installed in a motor vehicle.

9. The radar sensor device of claim 7, wherein the radar sensor device is operable such that at least one of the transmitting antenna elements is part of more than one of the antenna systems.

10. The radar sensor device of claim 7, wherein the transmitting antenna elements are situated and aligned such that the transmission ranges of the transmitting antenna elements of the first antenna system have essentially no overlap with the transmission ranges of the transmitting antenna elements of the second antenna system.

11. The radar sensor device of claim 7, wherein the radar sensor device is operable such that at least a part of the transmitting antenna elements, whose transmission ranges do not overlap, have the same transmit signal.

12. The radar sensor device of claim 7, wherein the plurality of antenna systems includes at least three antenna systems.

* * * * *